Jan. 9, 1968   R. H. MacKAY   3,362,686
DRIVE FOR ROTATING DRUM
Filed May 11, 1966   3 Sheets-Sheet 1

INVENTOR
ROBERT H. MacKAY
by JEFFERS & YOUNG
ATTORNEYS

Jan. 9, 1968  R. H. MacKAY  3,362,686
DRIVE FOR ROTATING DRUM
Filed May 11, 1966  3 Sheets-Sheet 2

INVENTOR
ROBERT H. MacKAY
by JEFFERS & YOUNG
ATTORNEYS

United States Patent Office 3,362,686
Patented Jan. 9, 1968

3,362,686
DRIVE FOR ROTATING DRUM
Robert H. MacKay, Fort Wayne, Ind., assignor to Lincoln Manufacturing Co., Inc., Fort Wayne, Ind., a corporation of Indiana
Filed May 11, 1966, Ser. No. 549,357
6 Claims. (Cl. 254—150)

ABSTRACT OF THE DISCLOSURE

A rotating drum is positioned around an electric motor and supported by end plates which rotated about extensions from the motor. The drum is driven by a drive gear mounted on the motor shaft, idler gears mounted on a motor plate around the drive gear, and a ring gear mounted inside the drum around the idler gears.

---

The invention relates to a drive arrangement for a rotating drum, and particularly to such a drive arrangement for a belt or an endless belt conveyor.

Belt or endless belt conveyors are used in many applications to transport materials or articles from one location to another. Such belt conveyors are supported on rotatable drums or rollers which guide and support the belt as it moves. One or more of the drums is powered or driven so as to move the belt at the desired speed. Previously, the power or drive for the one or more powered or driven drums has been provided by external connections and mechanisms. For example, an electric motor or other source of power has been connected to one or more drums by sprockets and chain belts, or by pulleys and belts. Such connections and mechanisms add to the size and weight of the conveyor drive. This is particularly true where the conveyors are relatively small and are used to transport relatively light objects, such as trays of food in a hospital kitchen. The connections and mechanisms do not always provides the needed torque or drive. They are a hazard to personnel, and are subject to stoppage and damage resulting from foreign objects and dirt getting in them. And, they are difficult to keep clean, particularly where they are lubricated with oil or grease.

Accordingly, an object of the invention is to provide an improved drive for a rotating drum.

Another object of the invention is to provide a rotating drum drive arrangement that has no external drive connections and mechanisms.

Another object of the invention is to provide a rotating drum drive arrangement, particularly for a belt conveyor, that presents relatively little hazard to personnel.

Another object of the invention is to provide a rotating drum drive arrangement that is self-contained, and hence less subject to stoppage, damage, and contamination.

Briefly, these and other objects are achieved in accordance with the invention by a generally cylindrical drum or roller which contains an electric motor that provides the power to rotate or drive the drum or roller. The motor has a drive gear connected to its output shaft for rotation thereby. The motor is mounted at each end by suitable supports, one of which comprises a gear plate having a plurality of symmetrically positioned idler gears which surround and engage the drive gear. A planet or ring gear with internal teeth surrounds and engages the motor and gears, and is supported on rotatable two end plates which are supported on bearings mounted on the supports. One end plate is fastened to the planet gear so that the one end plate and drum are rotated thereby through the idler gears and the drive gear. Thus, the motor and gears are all contained within the drum and end plates, and provide an improved drive for the drum. The drum may drive a belt or endless belt conveyor, or any other similar device.

The subject matter which I regard as my invention is particularly pointed out and distinctly claimed in the claims. The structure and operation of my invention, together with further objects and advantages, may be better understood from the following description given in connection with the accompanying drawing, in which:

Figure 1:
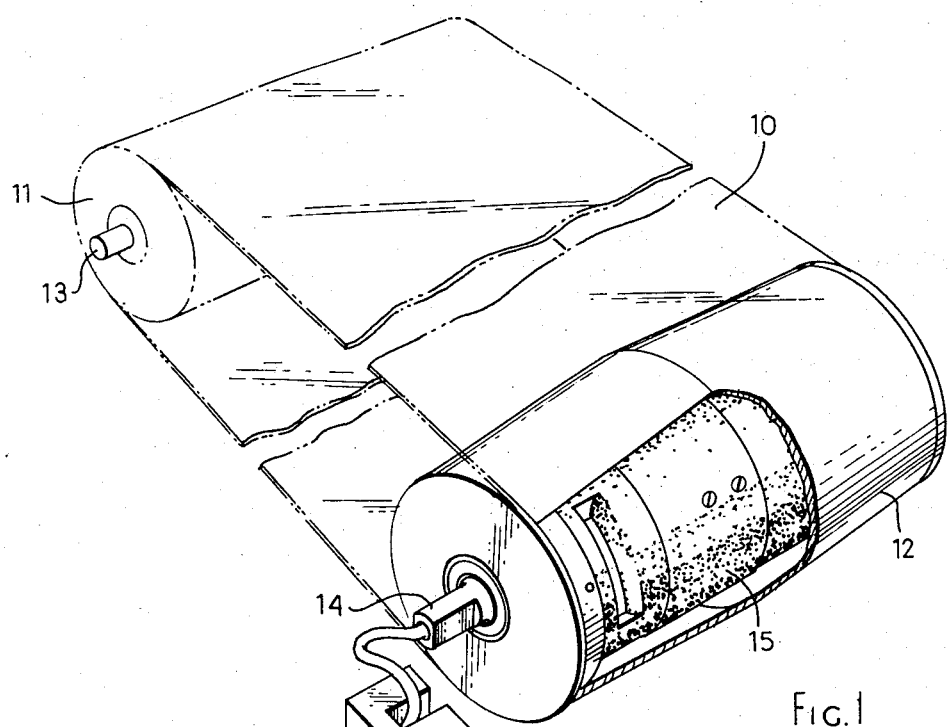
FIGURE 1 shows a perspective view of an endless belt conveyor utilizing a drive arrangement in accordance with the invention.

The conveyor shown in the perspective view of FIGURE 1 is a typical embodiment with which the drive arrangement of the invention can be used. The conveyor of FIGURE 1 comprises a belt or endless belt 10 which is mounted on and rotated by two cylindrical drums or rollers 11, 12. These drums 11, 12 are supported on suitable mounting extensions or supports 13, 14, which extend from both ends of the drums 11, 12 for mounting on a suitable support (not shown). The drum 12 is driven by an electric motor 15 through the drive arrangement in accordance with the invention. The electric motor 15 may be of any desired type, one preferable type being a direct current motor whose speed can be varied in accordance with the setting of a rectifier and control 16 which, in turn, is supplied with conventional 115 volt, 60 cycle alternating current. The drum 11, as shown in FIGURE 1, is an idler drum which does not power the belt 10, but provides rotating support for the belt 10. However, the drum 11 may be powered in accordance with the invention if desired or needed.

Figure 2:
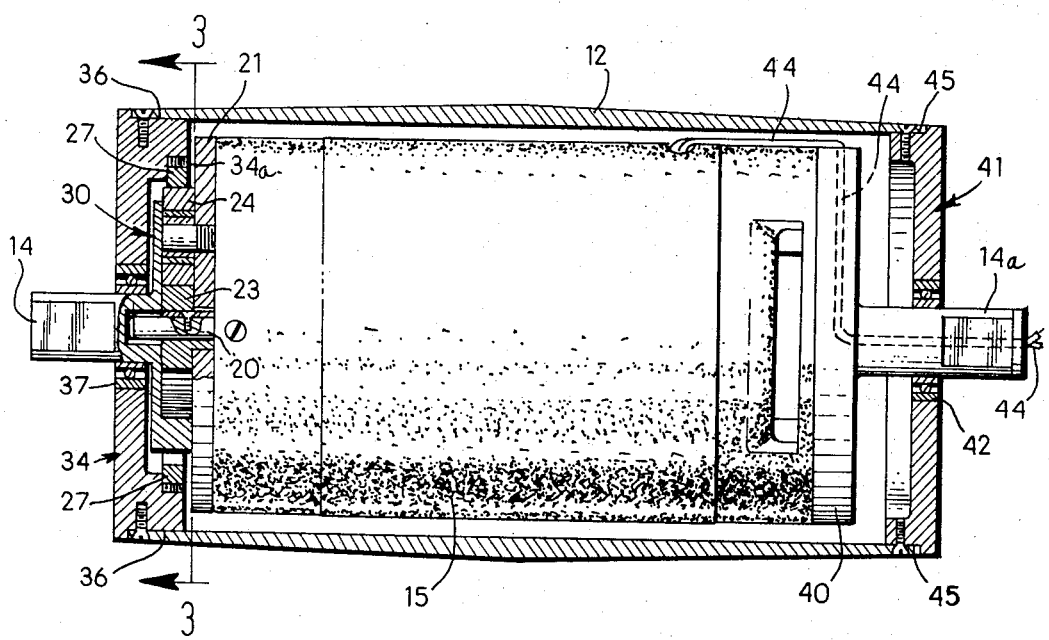
FIGURE 2 shows a longitudinal view, partly in cross section, of a drive arrangement in accordance with the invention.
Figure 3:
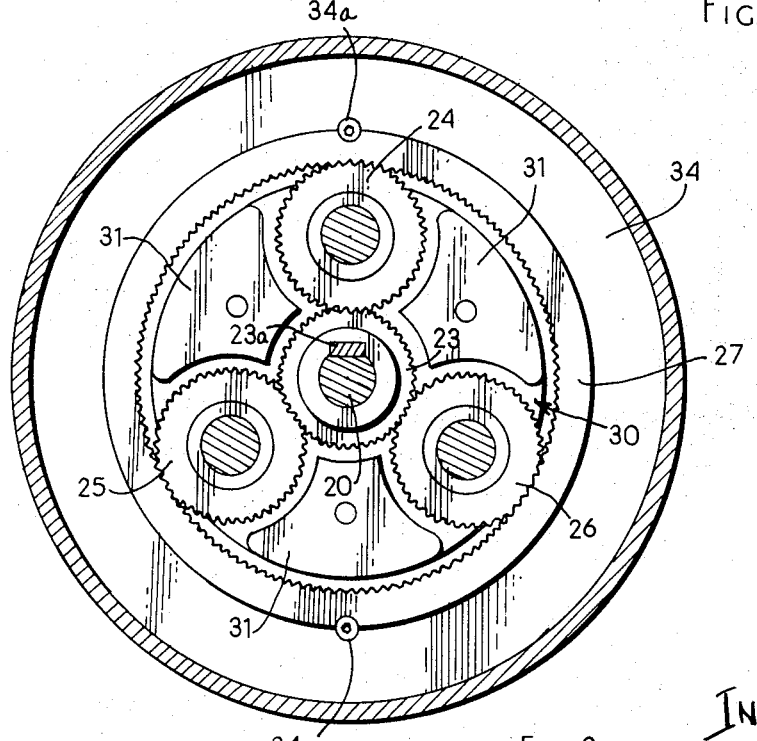
FIGURE 3 shows a transverse sectional view, taken along the lines 3—3 of FIGURE 2, of the drive arrangement in accordance with the invention.
Figure 4:
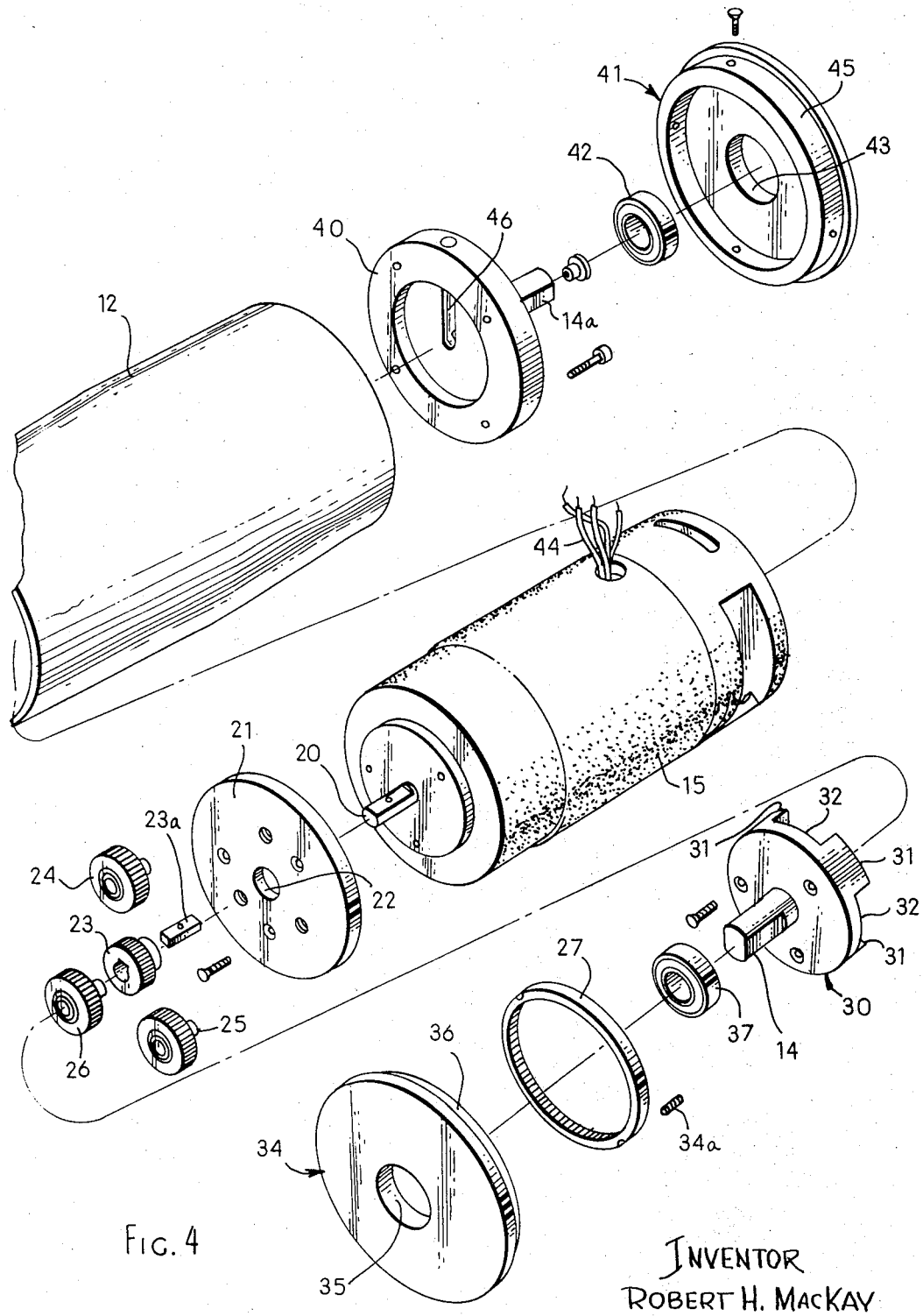
FIGURE 4 shows an exploded perspective view of the elements making up the drive arrangement of FIGURES 2 and 3; and, FIGURE 5 shows a perspective view of another application of the drive arrangement of the invention.

The drive arrangement for the drum 12 shown in FIGURE 1 is shown in FIGURES 2, 3, and 4. In these figures, corresponding parts have the same reference numerals. The electric motor 15 is, generally, a cylindrically shaped, elongated element having a longitudinal axis on which a motor output shaft 20 is positioned. While the motor 15 has been shown with only one output shaft 20, it will be appreciated that the motor 15 may have another output shaft at the other end. A circular gear plate 21 is fastened to the end of the motor having the output shaft 20. This gear plate 21 serves as a mounting for a number of gears, and has an internal circular opening 22 which permits the gear plate 21 to surround the output shaft 20 with suitable clearance. A drive gear 23 is securely fastened to the output shaft 20 by any suitable means such as a key 23a. A plurality of idler gears 24, 25, 26 are rotatably fastened to the gear plate 21 so that they are in engagement with and driven by the drive gear 23. As seen best in FIGURE 3, these idler gears 24, 25, 26 are symmetrically positioned about the drive gear 23 and are equally spaced 120 degrees apart. A circular ring or planet gear 27 having internal teeth surrounds and engages the three idler gears 24, 25, 26 so as to be driven thereby. Thus, the structure thus far described provides rotational power from the motor output shaft 20 through the drive gear 23 and the idler gears 24, 25, 26 to the planet gear 27.

A gear retainer and motor support 30 is positioned over the drive gear 23 and partially over the idler gears 24, 25, 26, and is attached to the gear plate 21. The retainer and support 30 has an outer diameter sufficiently small to permit the planet gear 27 to pass thereover, and has three legs or projections 31 which provide a mounting structure and three recesses or cavities 32 which provide clearance for the idler gears 24, 25, 26. The mounting extension 14 mentioned in connection with FIGURE 1 is attached to, or may be integral with, the retainer and support 30. The central part of the retainer and support 30 may be bored out to provide clearance for the drive gear 23 and the motor output shaft 20. A circular end plate 34 having an internal opening 35 is attached to the planet gear 27 by any suitable means such as the screws 34a. The end plate 34 also has a rim 36 to which the drum 12 may be fastened, as will be explained. The internal opening 35 receives a bearing 37 which is secured to the extension 14 and the end plate 34 so that the end plate 34 is rotatably supported on the mounting extension 14. In addition, the end plate 34 retains the planet gear 27 in engagement with the idler gears 24, 25, 26 and prevents the planet gear 27 from moving longitudinally.

At the other end of the motor 15, a motor support 40 is attached to the motor 15. The motor support 40 has a mounting extension 14a which corresponds in function to the extension 14 on the retainer and support 30. The motor support 40 may be configured so that leads 44 may be fed through its mounting extension 14a and a structure 46 for connection to the internal elements of the motor 15. A drum end plate 41 is rotatably mounted on the mounting extension 14a by a bearing 42 which is positioned in an opening 43 and secured to the extension 14a and the end plate 41. The end plate 41 also has a rim 45 for the drum 12.

Finally, the drum 12 is positioned around the motor 15 and secured to the rims 36, 45 on the two end plates 34, 41. As shown in FIGURE 2, the mounting extensions 14, 14a extend beyond the end plates 34, 41. The extensions 14, 14a may have a flat surface to provide secure and rigid support for the motor 15, and prevent the motor 15 its external structure from rotating. However, the motor output shaft 20 is free to rotate, and when it does so, it causes the end plate 34 to rotate with it (through the gears 23, 24, 25, 26, 27). This in turn causes the drum 12 to rotate, the drum 12 being held securely for free rotation by its end plates 34, 41 which are supported on the bearings 37, 42.

In the assembly of the drive arrangement, the drive gear 23, then the gear plate 21, and then the idler gears 24, 25, 26 are fastened. Then, the gear retainer and motor support 30 is attached to the gear plate 21, and the planet gear 27 is attached or positioned over the idler gears 24, 25, 26. At the other end of the motor, the motor support 40 is attached and the leader 44 brought out. Then, the drum 12 is slipped over the motor 15. Finally the end plates 34, 41 are fastened to their respective bearings 37, 42 which are then attached to their respective extensions 14, 14a. The rims 36, 44 are then fastened to the drum 12. Thus, the assembly of the drive arrangement is relatively simple.

Figure 5:
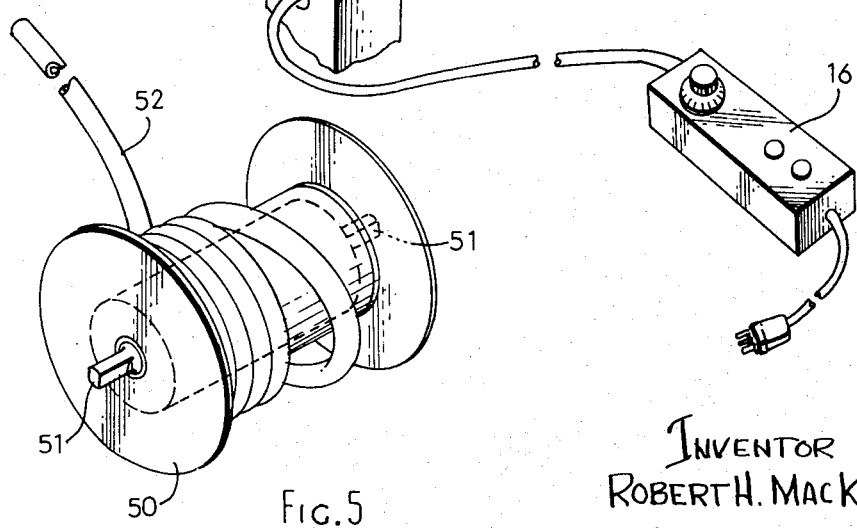

FIGURE 5 shows another application for the drive arrangement of the invention. This application provides drive for a hose or other type of reel 50 such as used on oil trucks. The arrangement is supported or mounted by suitable supports 51, and when the motor is energized, it causes the reel 50 to rotate and wind or unwind the hose 52. The motor for such an application would, of course, be reversible.

It will thus be seen that the drive arrangement in accordance with the invention provides a new and improved structure for transmitting power from a suitable device, such as an electric motor, to a drum or similar structure surrounding the motor. The drive arrangement is an improvement over the previously known sprocket and chain or pulley and belt type drives in that it is self-contained with the exception of electrical leads for the motor. Thus, there is no danger of personnel being caught in the drive arrangement, and there is no chance of objects or dirt getting into the drive arrangement since it is substantially self-contained. Further, the arrangement provides better torque characteristic because the motor is mounted relatively close to the rotating end plates. Persons skilled in the art will appreciate that modifications may be made to the drive arrangement. For example, both end plates may be driven by respective gear structures such as shown and described for the one end plate is drive or output shafts extend from both ends of the motor. And, any suitable diameters of gears may be used to provide the desired size and torque. Therefore, while the invention has been described with reference to a particular embodiment, it is to be understood that modifications may be made without departing from the spirit of the invention or from the scope of the claims.

What I claim as new and desire to secure by Letters Patent of the United States is:

1. An improved drive arrangement for a drum comprising:
   (a) an electric motor having a body and at least one output shaft extending from one end thereof;
   (b) first support means fastened to the other end of said motor, said first support means having a support member extending therefrom;
   (c) a first drum end plate rotatably mounted on said support member of said first support means;
   (d) a drive gear fastened to said output shaft of said motor;
   (e) a gear plate fastened to said one end of said motor;
   (f) a plurality of idler gears rotatably fastened to said gear plate for engagement with and rotation by said drive gear;
   (g) a planet gear positioned around said idler gears for engagement with and rotation by said idler gears;
   (h) second support means fastened to said gear plate, said second support means having a support member extending therefrom;
   (i) a cylindrical drum surrounding said motor and fastened to said first drum end plate and to said planet gear for rotation;
   (j) and means for mounting said arrangement by said support members to prevent said motor body from rotating.

2. The drive arrangement of claim 1 wherein said plurality of idler gears comprises three substantially similar idler gears symmetrically positioned 120 degrees apart.

3. The drive arrangement of claim 1 and further comprising leads passing through at least a portion of said first support means for energizing said electric motor.

4. An improved drive arrangement for a belt conveyor or the like comprising:
   (a) an electric motor having a longitudinal axis with first and second ends spaced along said axis and an output shaft extending from said first end along said longitudinal axis;
   (b) a gear plate fastened to said first end of said motor around said output shaft;
   (c) a drive gear fastened to said output shaft adjacent said gear plate;
   (d) a plurality of substantially similar idler gears rotatably mounted on said gear plate around and in drive engagement with said drive gear, said idler gears being symmetrically positioned around said drive gear;
   (e) a first support fastened to said gear plate and spaced from said gears, said first support having a mounting element extending therefrom;
   (f) a ring gear positioned around said idler gears with the inner portion of said ring gear in drive engagement with said idler gears;
   (g) a first circular end plate fastened to said ring gear and rotatably mounted on said mounting element of said support;

(h) a second support fastened to said second end of said motor, said second support having a mounting element extending therefrom;

(i) a second circular end plate rotatably mounted on said mounting element of said second support;

(j) a cylindrical drum surrounding said motor and fastened to said first and second circular end plates;

(k) and means for mounting said mounting elements against movement.

5. The drive arrangement of claim 4 wherein said gears, said support elements, said end plates, and said drum are symmetrically positioned around said longitudinal axis.

6. The drive arrangement of claim 5 wherein said plurality of idler gears comprises three idler gears spaced 120 degrees apart.

References Cited

UNITED STATES PATENTS

| | | | |
|---|---|---|---|
| 1,323,245 | 12/1919 | Borkes | 254—186 |
| 2,402,756 | 6/1946 | Lawler | 254—186 |
| 2,892,520 | 6/1959 | Sinclair | 254—186 |

FOREIGN PATENTS 303,929   12/1932   Italy.

EVON C. BLUNK, *Primary Examiner.*

H. C. HORNSBY, *Assistant Examiner.*